F. L. SESSIONS.
CONTROLLER FOR ELECTRIC MOTORS.
APPLICATION FILED DEC. 2, 1903. RENEWED JAN. 31, 1908.
934,097.
Patented Sept. 14, 1909.
4 SHEETS—SHEET 1.
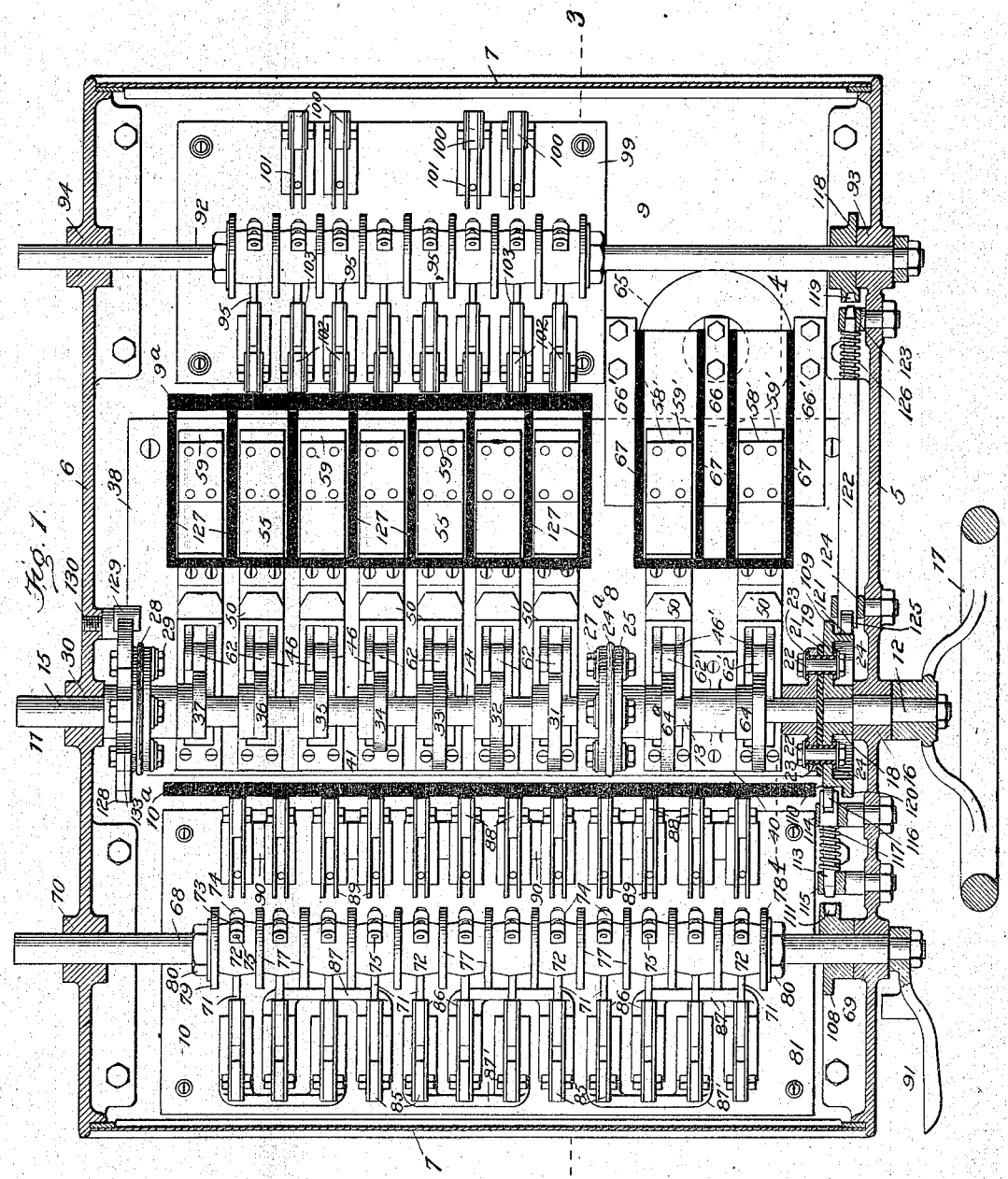
Witnesses
Edwin L. Bradford
Lewis T. Boynton
Inventor
Frank L. Sessions,
By H. H. Bliss,
Attorney F. L. SESSIONS.
CONTROLLER FOR ELECTRIC MOTORS.
APPLICATION FILED DEC. 2, 1903. RENEWED JAN. 31, 1908.
934,097.
Patented Sept. 14, 1909.
4 SHEETS—SHEET 2.
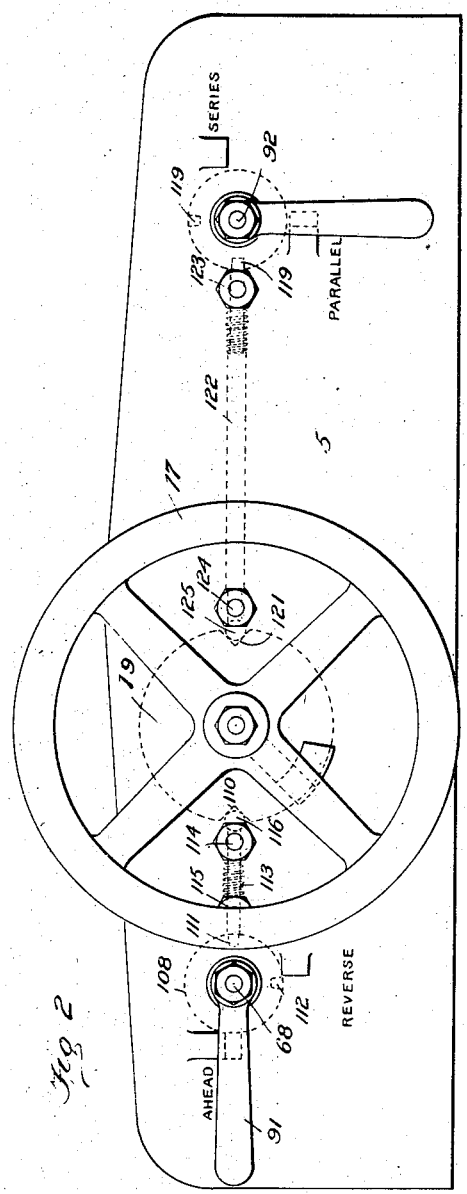
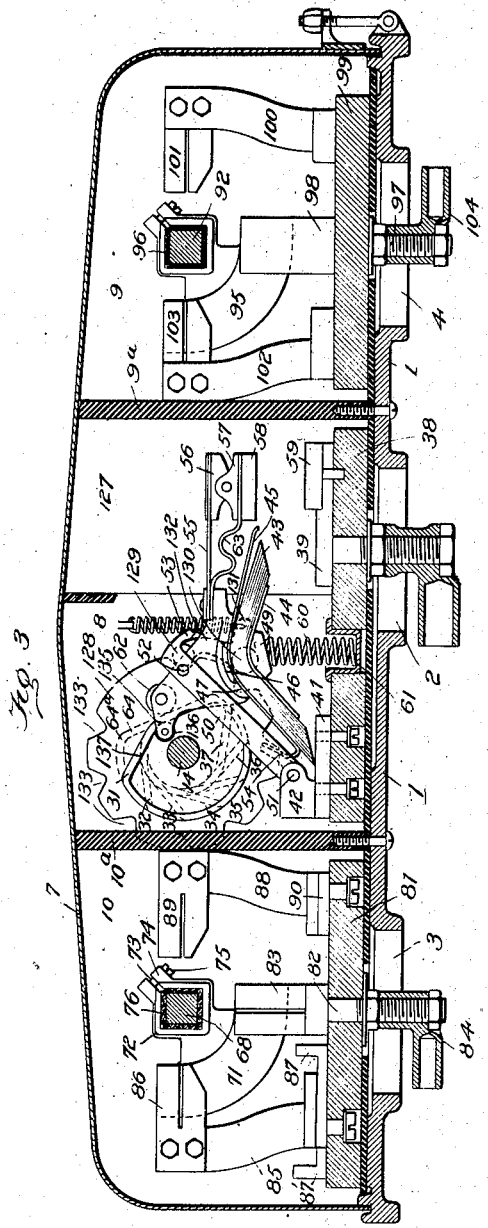
Witnesses
Edwin L. Bradford
Lewis J. Boynton
Inventor
Frank L. Sessions
By H. A. Bliss
Attorney F. L. SESSIONS.
CONTROLLER FOR ELECTRIC MOTORS.
APPLICATION FILED DEC. 2, 1903. RENEWED JAN. 31, 1908.
934,097.
Patented Sept. 14, 1909.
4 SHEETS—SHEET 3.
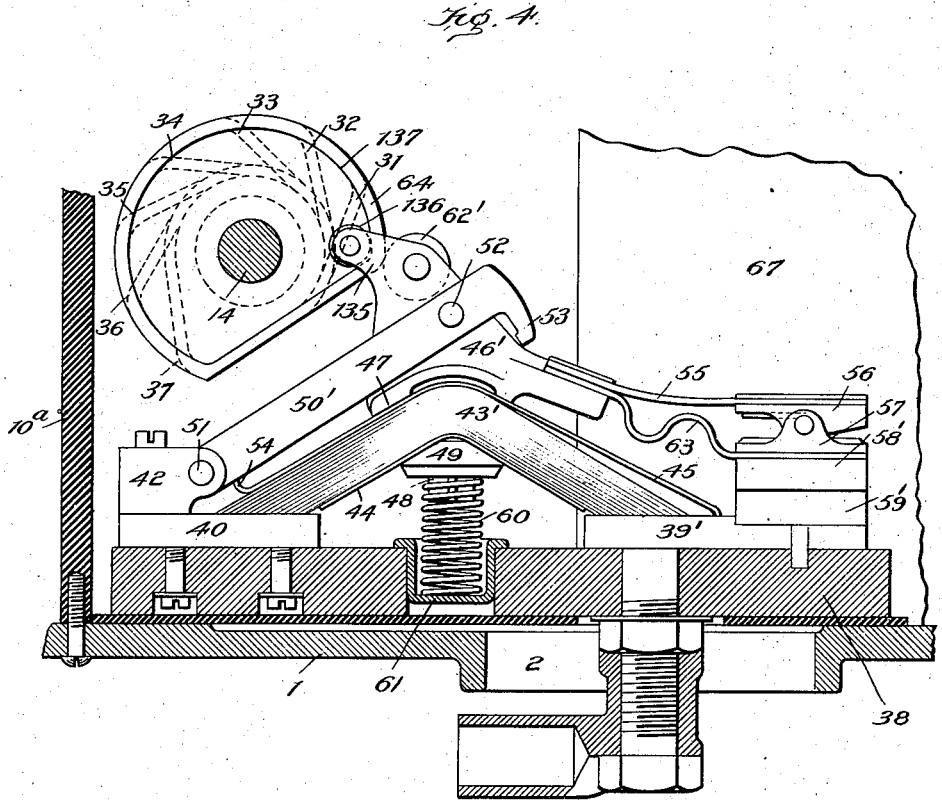
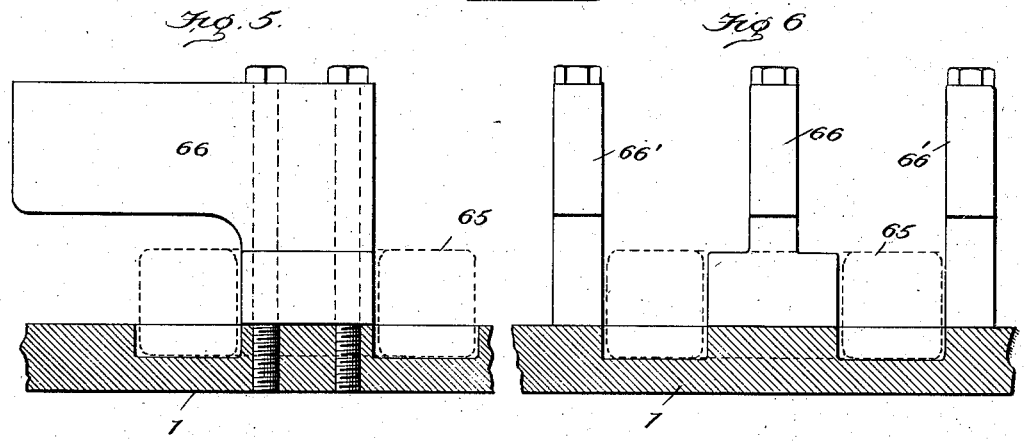
Witnesses
Edwin L. Bradford
Lewis P. Boynton
Inventor
Frank L. Sessions
By H. H. Bliss.
Attorney F. L. SESSIONS.
CONTROLLER FOR ELECTRIC MOTORS.
APPLICATION FILED DEC. 2, 1903. RENEWED JAN. 31, 1908.
934,097.
Patented Sept. 14, 1909.
4 SHEETS—SHEET 4.
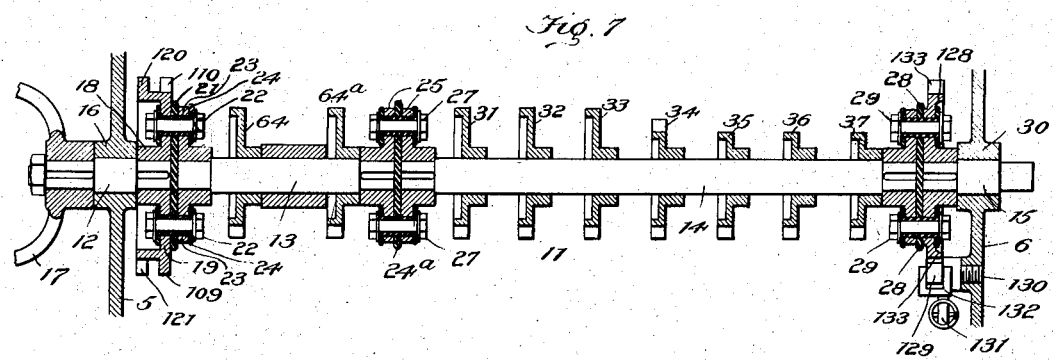

UNITED STATES PATENT OFFICE.

FRANK L. SESSIONS, OF COLUMBUS, OHIO, ASSIGNOR, BY MESNE ASSIGNMENTS, TO THE JEFFREY MANUFACTURING COMPANY, A CORPORATION OF OHIO.

CONTROLLER FOR ELECTRIC MOTORS.

934,097. Specification of Letters Patent. Patented Sept. 14, 1909.

Application filed December 2, 1903, Serial No. 183,492. Renewed January 31, 1908. Serial No. 413,649.

*To all whom it may concern:*

Be it known that I, FRANK L. SESSIONS, a citizen of the United States, residing at Columbus, in the county of Franklin and State of Ohio, have invented certain new and useful Improvements in Controllers for Electric Motors, of which the following is a specification, reference being had therein to the accompanying drawing.

This invention relates to improvements in controller mechanism used with electrical apparatus, it being particularly applicable for use in connection with the electric motors employed for propelling locomotives and vehicles of that class.

Figure 1 is a longitudinal sectional view of a controller embodying my improvements. Fig. 2 is an end elevation of a controller embodying my improvements. Fig. 3 is a transverse section on the line 3—3 Fig. 1. Fig. 4 is a transverse section on the line 4—4 Fig. 1. Figs. 5 and 6 are detail views of the "blow out" coil and magnet. Fig. 7 is a sectional view of the switching shaft for the controller. Figs. 8 to 13 show details.

The principal operative parts of the mechanism are inclosed within a box or casing. This is made with a back plate or base plate 1, a front end or top wall 5, a back end or bottom wall 6, and a shell like cover 7 having side walls and a front wall, as shown, the latter being detachably fastened to the base and the end walls. Preferably the base and end walls are formed of castings and the shell or cover is formed of sheet iron, fitted in recesses and against flanges or webs formed on the castings. The interior of this box or housing is divided into three chambers 8, 9 and 10, by means of vertical partitions or diaphragms 9ª, 10ª, of suitable insulating material. In the central compartment are mounted and arranged the parts which are utilized for switching the current, that is, for introducing it to and cutting it off from the motor and for directing it through the different parts of the rheostat or resistance. In the compartment 9 are arranged the "series parallel" devices, that is to say, those which are utilized for placing the motors in series relation to each other, or in parallel relation for purposes now well known in the art. In compartment 10 are placed the devices which are used for reversing the direction of the current with respect to the different parts of the motors so as to compel a reversal of rotation of the armatures with a corresponding reversal of the direction of travel of the vehicle.

The base or back wall 1 of the structure is formed preferably with elongated slots or openings, as shown at 2, 3, and 4, these permitting the ready attachment of the terminals or binding devices by which the conductor wires are connected up.

Referring to the parts in the compartment 8, 11 indicates as an entirety a sectional shaft. It has four shaft sections 12, 13, 14, and 15. These several sections are insulated from each other. The section 12 projects through and has a bearing at 16 in the end wall 5, its outer end being secured to the hand wheel 17 and its inner end being secured to the hub 18 of the disk 19. The next section of the shaft 13 has at its upper end a disk 20 which is rigidly fastened to the disk 19, there being an insulating disk 21 placed between them. They are clamped by means of bolts 22 which pass through insulating tubes 23, the heads of the bolts being also insulated by washers 24. This shaft section 13 has at its lower end a disk 25 which is clamped to the next section 14 by means of an insulating disk 24ª and insulated bolts at 27, in the way above described. And in turn the shaft sections 14 and 15 are similarly connected together by an insulating disk 28 and insulated bolts at 29. The end section 15 is mounted in a bearing 30 in the end wall 6 of the box. The shaft section 14 is provided with a series of cams, seven being shown at 31, 32, 33, 34, 35, 36, 37. The operative edge portion of each cam is of the same radius as that on each of the others. But the arcs or lengths of these edge portions differ, they becoming gradually shorter from the first cam at 31 toward that at 37. These cams are for the purpose of forcing a set of movable contacts respectively toward a corresponding set of stationary contacts.

The parts last referred to are mounted and constructed as follows. 38 indicates a base piece of insulating material such as slate which is secured to the interior surface of the base wall 1. 39 indicates one of a series of contacts which are secured to the inner face of this base 38. 40 represents a contact and conducting plate secured to the same base 38, but nearer the edge opposite to that which carries the contacts 39. 41 is a contact or conducting plate similar to that at 40, but somewhat longer and secured along the same edge of the insulating base 38. 42 is a hinge block secured to the face of the plate 41, this block being situated in the same planes transverse to the shaft 11 with the cam 31. And there are similarly hinged blocks secured to the plate 42 opposite to each of the other cams 32 to 37 inclusive.

43 represents one of a series of brushes. There is a brush for each of the cams 31 to 37. Each brush is built up of a series of laminæ of copper or similar material. It is V-shaped in form and the copper plates are clamped together between spring plates 44, 45. The brush holder or the part which supports the copper plates is indicated by 46. It is a casting with a concave socket or recess at 47 which conforms to the shape of the brush 43. The brush, proper, is seated in the concave part of the holder and is firmly clamped by means of a bolt 48 which passes through the brush plates and the springs and engages with the brush holder.

49 is a block of metal which is V-shaped upon its outer surface and fits snugly in the bend of the brush and provides a square bearing for the head of the bolt 48.

The brush holder 46 is pivotally connected to a swinging arm 50. This is pivoted to the aforesaid hinge block 42 by a hinge at 51. It is connected to the brush holder 46 by the pivot at 52. The arm or carrier 50 is bifurcated or slotted to provide a passage therethrough for the brush holder 46 which extends through it and projects toward the shaft 11. The end of the arm or carrier 50 has a laterally extending part 53 which bears against or lies close to one of the surfaces of the brush holding block 46. The spring plate 45 is turned backward, as shown at 54, so as to provide means for pressing against the arm 50 and assisting in causing it to swing backward when freed from its cam.

55 is a plate, preferably elastic, of copper or equivalent, which is secured to the brush holding block 46 and extends laterally therefrom. At its ends, it is provided with a hinge plate 56 which is pivotally connected to an opposing hinge plate 57. The latter has secured to it a contact block of carbon 58. Opposed to this carbon there is one at 59 which is secured to the above-described contact plate 39. These blocks of carbon 58 and 59 can separate when the movable one at 58 is relieved of pressure. At 60 there is a coil spring having its outer end seated in a socket 61 supported in the insulating base 38. The inner end of the spring 60 bears against the brush holder 46. When the spring is free in its action it pushes the V-shaped brush away from the contact plates 39 and 40.

62 is a roller mounted in the brush casting 46. It lies in the path of rotation of the cam 31. When the cam is rotated it bears upon the roller and through the latter exerts a pressure upon the brush block and upon the brush 43 and acts to force the brush into contact with the plates 39 and 41. At 63 there is a flexible conducting plate which extends from the brush block 46 to the carbon block 58, being rigidly secured to both.

If at any time when current is passing from the contact plate 39 to the brush 43 or vice versa (which will occur when the cam is engaging with the roller 62 and the brush block) the pressure upon the brush should be released by proper turning of the cam the spring at 60 will act to force the brush away from the contacts 39 and 41 and to break the circuit at those points. But because of the construction and arrangement of the carbon blocks at 58 and 59 and the parts connected therewith, the latter will separate at a time after the separation of the copper brush from its contacts so that the final break in the circuit is at the surfaces of the carbon.

I have above described the copper brush, the contacts, the carbon blocks, and the devices which support and carry them, which are used in conjunction with one of the cams, say that at 31. It will now be understood that a set of substantially similar parts is combined with each of the cams 32 to 37 inclusive, these being the cams which, as aforesaid, are connected to and carried by the section 14 of the shaft 11.

I now call attention to the fact that the section 13 of the shaft 11 also carries two cams, 64 and 64$^a$. These are substantially similar to each other in construction and in the length of their operative peripheral edges. With each of these cams there is provided a copper brush, a pair of carbon blocks, and a set of supporting and carrying parts similar to those above described in connection with the cam 31. For convenience, I indicate each copper brush here as 43′, each brush holder as 46′, each hinged arm as 50′, the carbon blocks of each pair as 58′ and 59′, and the rollers for the cams by 62′. The contact plates for the ends of the copper brush are shown at 39′ and 40′. It will be seen that if the shaft 11 is turned by the hand wheel 17 the cams 64 and 64$^a$ will first engage with their rollers 62′ and will cause their brush holders 36′ and their swinging arms 50′ to force the copper brush 43′ against the contact plates 39′ and 40′; and that immediately thereafter the cam 31 will engage with its roller 62 and compel its copper brush to move into engagement with its contact surfaces 39 and 41, and that thereafter the cams 32 to 37, successively, will come into engagement with their rollers 62 and successively cause the contact of their copper brushes with the opposing contact plates. By this means the current is first introduced to the switching mechanism and then directed toward the rheostat or resistance. Then, step by step, the elements of resistance are cut out until none is interposed in the path of the current. It will also be seen that upon a reversal of the rotation of the shaft 11 in the opposite direction the elements of the resistance are successively brought into circuit until the whole is again introduced and that shortly after this occurs the cams 64 and 64$^a$ are released from their rollers and brush holders and the springs break the circuit, first breaking it through the copper and then at the surface of the carbon blocks.

The construction and arrangement of parts that I have described compel the formation between the surfaces of the carbon blocks of whatever arc is produced by the breaking of the circuit, and, as there are two copper brushes and two pairs of carbon blocks, whatever arc is caused will be divided between the pairs of carbon blocks.

In order to provide a "blow out", I employ a magnet having the coil 65 and the peculiarly shaped pole pieces 66—66'. The latter are in the form of plates.

The positive pole 66 lies between the upper two pairs of carbon blocks, and the negative poles 66' lie respectively one above the carbon blocks and one below them. These poles are so arranged that the lines of magnetic force cross the lines of the arcs that may be formed when the movable carbon blocks are drawn away from the stationary ones. Each of these pairs of contact carbons has insulating walls, as shown at 67, which prevent the current from jumping to neighboring metal parts. The lower series of brushes and contacts which are opposite, respectively to the cams 31 to 37 are also inclosed in insulated chambers. These are provided by means of the aforesaid vertical insulating wall or diaphragm 9$^a$ and a series of horizontally arranged insulating partitions 127. One of the latter is arranged above the series of brushes and one below the series, and one is also placed between each pair of contacts and the next adjacent one.

As aforesaid, in the compartment 10 of the box are placed the parts by which the reversing of the current through the motors and the reversal of the rotation of the armature are effected.

68 is a shaft mounted in a bearing at 69 in the end wall 5 of the box and in a bearing 70 in the end wall. This shaft is along its central part square. To it are attached a series of contact segments 71. Each contact is cast or formed with a square socket piece 72 which is preferably split at 73 and formed with ears 74, one of which is threaded to receive a clamping bolt 75 by which the parts of the square hub can be drawn together and tightly clamped to the shaft 68.

76 indicates sections of insulating material which are placed around the shaft 68 and between it and the hubs 72 of the contacts. The contacts are separated from each other vertically by insulating disks 77 and insulators at 78, 79, at the top and bottom of the series insulate all the hubs and contact segments or brushes from the upper and lower parts of the shaft and from the clamping devices at 80.

81 is an insulating base piece of slate or the like which is bolted to the base wall 1 of the box. To this there are secured along one edge a series of brush contact devices. Each has a stem 82. To the end of each are clamped copper plates 83 so situated that one of the movable segments or brushes 71 can move through the space between the plates 83 of the pair. The stem 82 projects through the base plate 81 and the outward extending part has secured to it one of the angular connectors 84 by which the conductor wire is secured in place and electrically connected with the stem and the contact plates 83.

Along one edge of the insulating base plate 81 there are arranged a second series of contacts. Each has a standard 85 and at the outer end of the standard there are contact plates 86. These contacts are electrically connected by means of connectors 87, 87'. These are preferably castings of U-shape adapted to have their legs bolted tightly in place under the foot pieces of the contact standards 85. These connectors electrically join alternate contacts, those at 87 for instance connecting the first and third, the fifth and seventh, and so on, while those at 87' connect the second and fourth, the sixth and eighth, etc. Along the other edge of the base 81 there is arranged a series of contacts. Each of these has a contact standard 88 with a pair of contact plates 89 adapted to receive between them one of the segments or brushes 71. These left hand contacts, however, are electrically coupled up in a different manner from that above described, each being connected to one of those directly adjacent. For connecting them metallic plates 90 are used, each plate lying under and being clamped by two of the standards 88. Contact 1 is thus connected electrically with contact 2; 3 with 4, 5 with 6, and so on through the series.

The wires which are secured to the terminals or binding devices at 84 are so arranged that when the shaft 68 is turned to bring the brushes or segments 71 into contact with the plates 83 and the plates 86, the current passes to the motor in such way as to cause a forward rotation of the armature; and when the shaft 68 is turned one quarter of the way around to bring the brushes 71 into contact with the plates 83 and the plates 89, current will be taken through such paths as will cause the armature to rotate in the opposite direction in consequence.

91 is a hand lever secured to the shaft 68 for turning it from one of its positions to the other.

In the apartment 9, as above stated, are arranged the devices by which current is directed to the motors in such way as to have them connected either in series or in parallel.

92 is a shaft mounted at its upper end in a bearing 93 in one end wall of the box and at 94 it is mounted in the opposite wall. This shaft is provided with a series of segments or brushes 95. The shaft is square and provided with layers of insulating material 96 against which the square hubs of the brushes 95 are clamped. The brushes or segments have electrical connection, respectively, with a series of contacts, each formed with a stem 97 and with a base 98. These are passed through an insulating base piece 99 secured to the wall of the box. Along one edge of this piece there are arranged a series of contacts somewhat similar to those above described at 88, 89 and 90, they each having a standard 100 and contact plates 101. Along the opposite edge of this insulating piece 99 another series of contacts are placed, each having a standard 102 and a pair of contact plates 103. The contacts at 98 extend outward and have secured to their stems the binding tubes 104 by which the conductor wires are attached. When the shaft 92 is turned in such way as to bring segments or brushes 95 into contact with the plates at 98 and those at 103, the motors are put into parallel relation with each other. When the shaft is turned so that the segments 95 are brought into contact with the plates at 101, the current is so directed as to connect the motors in series.

I combine with the shaft, above described, devices which prevent either the one at 68 or the one at 92 from being movable except at times when the switching shaft 11 is in its "off" position. The shaft 68 has a disk 108 secured to it near its outer end. The disk 19 on the shaft 11 has two flanged edges 109 and 120, the inner one 109 being provided with a notch or recess 110. The disk 108 on the shaft 68 has two recesses 111 and 112. 113 is a locking pin mounted in bearings 114 and 115 supported from the end wall 5 of the box. 116 is a roller in the end of the locking pin or bolt adapted to ride upon the edge of the peripheral flange of the disk 19 and also adapted to seat itself in the cavity or notch 110. A spring 117 bears against the squared end on the locking pin in such a way as to tend to force it toward the disk 19. When the switching shaft is so turned as to cut the current off, notch 110 comes to the line of the lock bolt and the spring 117 forces the end of the bolt or roller 116 into the recess. When the locking pin is in this position the disk 108 is free and the shaft 68 can be rotated, the operator being permitted to put the reverse lever in the desired position. When he has set the reversing shaft, he can turn the switching shaft by the hand wheel, inasmuch as the locking pin can be moved longitudinally if the disk 19 be turned by the hand wheel, which will force the roller out of the recess, driving the pin into disk 108. As long as the shaft 11 is in any position which permits current to travel, it will be impossible to turn the reversing mechanism. And, on the other hand, until the reversing mechanism has been put in one or the other of its extreme positions, the disk 108 will not permit the turning of the switching shaft. The series parallel shaft 92 is similarly locked as to the switching shaft. 118 is a disk secured to the shaft 92 and having two locking sockets 119. The disk 19 has in its flange 120 a recess or notch 121. 122 is a lock bolt or pin mounted in bearings 123, 124. This is provided with a roller 125 adapted to ride on the periphery of flange 120 or seat itself in a socket 121. 126 is a spring bearing against the square part of the lock bolt and tending to force it toward the disk 109.

It will be seen that it will not be possible to turn the shaft 92 until the notch 121 is in line with the lock pin 122, at which time the spring will force the pin out from the disk 118.

128 is a disk or flange situated near and secured to the end section 15 of the shaft 11. It is provided with a series of notches corresponding to the cams that have been above described. 129 is a pawl pivotally supported at 130 on the end wall 6. The arm 131 is connected to a spring arranged so as to cause the other arm 132 to bear against the periphery of the disk or to enter successively the notches 133 in its periphery.

In order to insure that the electrical contact between the brushes carried by the contact holders 46, 46' and the stationary contacts with which they engage will positively be broken when the operative surfaces of the cams on the switching shaft 11 are out of contact with their respective rollers 62, 62' on the brush holders, I provide each brush holder at its upper end with a laterally projecting arm 135. At their inner ends these arms 135 carry anti-friction rollers 136 which are adapted to engage with the inner surfaces of the rims 137 of their respective contact cams. With this construction it will be seen that even should the springs 60 become inoperative, the engagements of the rollers 135 with the inner surfaces 137 of the cams will cause the breaking of the electrical contact controlled by each cam as it is rotated into its "off" position. This arrangement of the parts insures a positive separation of the brushes in the event of the failure of any of the springs 60 to force their brush holders upwardly as their respective cams are turned into their "off" positions.

What I claim is:—

1. In a controller for electrical apparatus, the combination of a series of stationary contacts, a series of movable contacts, a series of rocking holders for said contacts, a series of swinging arms to which said holders are pivotally connected, and a series of rotary devices each arranged to engage directly with one of said rocking holders and to force the contact carried thereby into engagement with its coöperating stationary contacts.

2. In a controller for electrical apparatus, the combination of a series of pairs of stationary contacts, a series of pairs of coöperating movable contacts, a series of rocking contact holders, each adapted to carry one pair of said movable contacts, a series of swinging arms to each of which one of said contact holders is pivotally connected, and a series of rotary devices each arranged to engage directly with one of said contact holders and to move it so as to cause its contacts to engage with the coöperating pair of stationary contacts.

3. In a controller for electrical apparatus, the combination of a series of stationary contacts, a series of non-rotary reciprocating contacts, the swinging arms, the contact holders pivotally connected to said swinging arms, means for successively moving the reciprocating contacts into electric connection with the stationary contacts, and the spring for separating the contacts, substantially as set forth.

4. In a controller for electrical apparatus, the combination of the series of pairs of movable contacts, the series of coöperating pairs of stationary contacts, means for normally separating the contacts of each of said pairs, and manually controlled devices for causing the contacts of each of the pairs to become electrically connected and also for positively disconnecting them, substantially as set forth.

5. In a controller for electrical apparatus, the combination of the series of stationary contacts, the series of movable contacts, the swinging holders for the movable contacts, the series of cams for operating said swinging holders to cause the successive engagement of the coöperating contacts, and the series of cams engaging with said holders to effect the positive separation of the coöperating contacts.

6. In a controller for electrical apparatus, the combination of the series of stationary contacts, the series of movable contacts, the series of double faced cams, the two cam-engaging elements carried by each movable contact, each adapted to engage with one of the faces of said cams, one of said faces being adapted to cause the positive engagement of its associated contact with the coöperating stationary contact, and the other face being adapted to effect the positive separation of the said contacts.

7. In a controller for electrical apparatus, the combination with a series of stationary contacts, and a series of movable contacts, of the pair of cam-engaging elements carried by each of said movable contacts, and the series of double-faced cams coöperating with the said cam-engaging elements of the said movable contacts.

8. In a controller for electrical apparatus, the combination of a series of stationary contacts, a series of coöperating movable contacts, means for positively moving each of said movable contacts successively into operative engagement with its coöperative stationary contact, a series of springs each arranged to force the contacts of each of said coöperating pairs of contacts out of engagement with each other, and means for positively moving the contacts of each of said pairs of contacts out of engagement with each other.

9. In a controller for electrical apparatus, the combination of a series of stationary contacts, a series of movable contacts, a series of contact holders for the movable contacts, means for positively engaging said contact holders and moving them so as to effect the successive engagement of the pairs of coöperating contacts, and the series of springs, each arranged to engage with one of said contact holders and to normally hold it with its contact member out of engagement with the coöperating stationary contact.

10. In a controller for electrical apparatus, the combination of a series of stationary contacts, a series of movable contacts, a series of swinging contact holders for the movable contacts, means for positively engaging said contact holders and moving them so as to effect the successive engagement of the pairs of coöperating contacts, and the series of springs, each arranged to engage with one of said contact holders and to normally hold it with its contact member out of engagement with the coöperating stationary contact.

11. In a controller for electrical apparatus, the combination of a series of stationary contacts, a series of movable contact holders, a series of pairs of movable contacts carried by said holders, and one contact of each pair being yieldingly connected to its respective holder, and means for successively forcing the pairs of said movable contacts into engagement with their coöperating pairs of stationary contacts.

12. In a controller for electrical apparatus, the combination of a series of stationary contacts, a series of movable contact holders, a pair of spring plates carried by each of said holders, and a movable contact element secured between the plates of each pair of said spring plates.

In testimony whereof I affix my signature in presence of two witnesses.

FRANK L. SESSIONS.

Witnesses:
C. E. WALBORN,
L. E. HAMILTON.